United States Patent
Lee et al.

(10) Patent No.: US 7,471,350 B2
(45) Date of Patent: Dec. 30, 2008

(54) ARRAY SUBSTRATE FOR LIQUID CRYSTAL DISPLAY AND FABRICATION METHOD THEREOF

(75) Inventors: Kyoung Mook Lee, Seoul (KR); Seung Hee Nam, Gyeonggi-do (KR); Jae Young Oh, Gyeonggi-do (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 10/663,774

(22) Filed: Sep. 17, 2003

(65) Prior Publication Data

US 2004/0257487 A1 Dec. 23, 2004

(30) Foreign Application Priority Data

Jun. 20, 2003 (KR) .................. 10-2003-0040394

(51) Int. Cl.
*G02F 1/136* (2006.01)
*G02F 1/1343* (2006.01)

(52) U.S. Cl. ...................... 349/43; 349/139

(58) Field of Classification Search .......... 349/42–43, 349/46, 47, 138–139; 438/30
See application file for complete search history.

(56) References Cited

U.S. PATENT DOCUMENTS

| | | | | |
|---|---|---|---|---|
| 5,303,074 A * | 4/1994 | Salisbury | ................ | 349/55 |
| 5,856,854 A * | 1/1999 | Hyun | ................ | 349/43 |
| 6,184,947 B1 * | 2/2001 | Ozaki et al. | ................ | 349/42 |
| 6,215,541 B1 * | 4/2001 | Song et al. | ................ | 349/141 |
| 6,256,077 B1 * | 7/2001 | Baek | ................ | 349/43 |
| 6,307,216 B1 * | 10/2001 | Huh et al. | ................ | 257/59 |
| 6,365,917 B1 * | 4/2002 | Yamazaki | ................ | 257/72 |
| 6,461,899 B1 * | 10/2002 | Kitakado et al. | ................ | 438/149 |
| 6,847,422 B2 * | 1/2005 | Zhang et al. | ................ | 349/106 |

FOREIGN PATENT DOCUMENTS

WO WO 03/058332 A1 * 7/2003

* cited by examiner

*Primary Examiner*—Dung T. Nguyen
(74) *Attorney, Agent, or Firm*—McKenna Long & Aldridge LLP

(57) ABSTRACT

Disclosed is an array substrate for a liquid crystal display, including: a substrate; a gate line and a thin film transistor having a gate electrode, a source electrode, a drain electrode and an active layer formed over the substrate; an interlayer insulating layer formed on the thin film transistor; a first gate redundancy line formed on the interlayer insulating layer, and connected electrically with one of the gate electrode and the gate line through a first gate contact hole and formed of the same material as the source and drain electrodes; a passivation layer provided on the first gate redundancy line and the interlayer insulating layer; and a pixel electrode electrically connected with the drain electrode through the drain contact hole formed in the passivation layer.

27 Claims, 14 Drawing Sheets

ARRAY SUBSTRATE FOR LIQUID CRYSTAL DISPLAY AND FABRICATION METHOD THEREOF

This application claims the benefit of Korean Patent Application No. 2003-40394, filed on Jun. 20, 2003, which is hereby incorporated by reference for all purposes as if fully set forth herein.

BACKGROUND OF THE INVENTION

1. Field of the Invention

The present invention relates to a liquid crystal display, and more particularly, to an array substrate for a liquid crystal display and a fabrication method thereof.

2. Description of the Related Art

Recently, as modern society quickly changes in an information-oriented society, flat panel displays having many advantages such as slimness, light weight, and low power consumption are widely used. Particularly, among the flat panel displays, liquid crystal displays (LCD) having superior color reproduction have been developed.

As known in the art, a liquid crystal display is formed by the steps of: arranging two substrates each having electrode formed on one surface thereof to face with each other; and injecting liquid crystal material between two substrates. In the liquid crystal display, images are displayed by rearranging liquid crystal molecules by an electric field generated by a voltage applied to two electrodes to vary light transmittance.

In the above liquid crystal display, a lower substrate is an array substrate including a thin film transistor for applying a signal to a pixel electrode and is formed by repeating a metallic film and insulating film forming step and a lithography step. Further, an upper substrate is a substrate including a color filter layer of three colors of red, green and blue sequentially arranged and is manufactured using a pigment dispersion method, a dyeing method, an electro deposition method, etc.

Generally, an active layer of the thin film transistor is formed of amorphous silicon (a-Si:H). This is because the amorphous silicon is easily fabricated in a large-sized structure, thereby resulting in a higher productivity, and the amorphous silicon can be deposited on the substrate at a lower temperature below 350° C., thereby permitting use of a lower price insulating substrate.

However, because a hydrogenated amorphous silicon is in disordered atomic arrangement due to a weak Si—Si bond and a dangling bond, when light is radiated on or an electric field is applied to the hydrogenated amorphous silicon, it is changed to be in a meta-stable state, so that when the amorphous silicon is used in the thin film transistor, questionable stability results.

In particular, the amorphous silicon has a disadvantage in which deterioration is caused by light radiation. Further, because a driving unit for a display pixel has an electric characteristic (low field effect mobility:0.1~1.0 cm$^2$/V·s) that causes the reliability to deteriorate, the amorphous silicon is difficult to use in a driving circuit.

Further, if a liquid crystal panel for the liquid crystal display increases in resolution, the pad pitch external to the substrate is narrowed for connecting a gate line and a data line of a thin film transistor substrate with a tape carrier package (TCP), so that TCP bonding itself becomes difficult.

However, because polycrystalline silicon has a field effect mobility larger than the amorphous silicon, the driving circuit can be formed directly on the substrate, which decreases the manufacturing cost for a driving integrated circuit and simplifies the mounting structure of the driving IC.

Further, the above polycrystalline silicon has the advantages that the field effect mobility is one hundred to two hundreds times larger than that of the amorphous silicon, the response speed is fast, and the stability is excellent with respect to temperature and light. Furthermore, the polycrystalline silicon has the advantage that the driving circuit can be formed on the same substrate.

Various fabrication methods of polycrystalline silicon having the above advantages are known in the art. Typically, to form polycrystalline silicon, amorphous silicon is deposited through a plasma enhanced chemical vapor deposition or a low pressure chemical vapor deposition, and the deposited amorphous silicon is again crystallized.

As one method of forming polycrystalline silicon uses a laser annealing method in which the substrate is heated to a temperature of about 250° C. while an excimer laser radiates a thin amorphous silicon film to form the polycrystalline silicon. Another crystallizing method is a metal induced crystallization (MIC) method in which a metal deposited on the amorphous silicon is used as a seed to form the polycrystalline silicon. Another crystallizing method is a solid phase crystallization (SPC) method in which the amorphous silicon is heated for a long time at a high temperature to form the polycrystalline silicon, etc.

On the other hand, in order to provide a reliable thin film transistor, it is important to form a larger crystalline grain. One method for solving this is a single crystalline forming method (Robert S. Sposilli, M. A. Crowder, and James S. Im, Mat. Res. Soc. Symp. Proc. Vol. 452, 956~957, 1997) using a sequential lateral solidification (SLS) crystallization technique that uses the fact that the silicon crystalline grain grows up from a boundary surface between a liquid-phase silicon and a solid-phase silicon in a vertical direction.

In the SLS crystallization technique, the magnitude of the laser energy, and the range and the translation distance of the laser beam are properly controlled such that the silicon crystalline grain can be laterally grown-up by a predetermined length to allow the amorphous silicon to be crystallized as a single crystalline silicon.

Hereinafter, with reference to the attached drawings, a conventional array substrate and fabrication method thereof will be described including a polycrystalline silicon thin film transistor.

FIGS. 1A and 1B are sectional views respectively illustrating conventional top-gate type thin film transistors of a pixel and a driving circuit, and the pixel and the driving circuit all employ a top-gate type thin film transistor in which a gate electrode is positioned over a semiconductor layer.

First, in a pixel thin film transistor (I) of FIG. 1A, a buffer layer 114 is formed on a whole insulating substrate 100, a semiconductor layer 116 is formed on the buffer layer 114, and then a gate insulating layer 118 and a gate electrode 120 are sequentially formed on a central portion of the semiconductor layer 116.

Further, an interlayer insulating layer 124 having first and second semiconductor layer contact holes 122a and 122b formed therein is formed on the whole resultant substrate having the gate electrode 120. Additionally, source and drain electrodes 126 and 128 are formed to connect with the semiconductor layer 116 through the first and second semiconductor layer contact holes 122a and 122b.

Furthermore, a passivation layer 132 having a drain contact hole 130 formed therein is formed on the resultant substrate having the source and drain electrodes 126 and 128, and a pixel electrode is formed on the passivation layer to connect with the drain electrode 128 through the drain contact hole 130.

The semiconductor layer 116 includes an active layer 116a formed in a region corresponding to the gate insulating layer 118, and an N+ doped N-type impurity layer 116c formed in a contact region with the source and drain electrodes 126 and 128. In a junction portion between the source and drain electrodes 126, 128 between the active layer 116a and the N-type impurity layer 116c and the gate electrode 120, a lightly doped drain (LDD) layer 116b is located.

The LDD layer 116b is doped with a lower concentration for the purpose of dispersing hot carriers so as to prevent a leakage current from increasing and to minimize a current loss in an ON state.

In FIG. 1B, a complimentary metal-oxide-silicon (CMOS) thin film transistor includes a thin film transistor (II) having an N doped channel and a thin film transistor (III) having a P doped channel, and for description convenience, the same elements are numbered in a sequence of II and III.

As shown in FIG. 1B, an N-type semiconductor layer 140 and a P-type semiconductor layer 142 are formed on the insulating substrate 100 having the buffer layer 114 formed. Herein, the gate insulating layers 144a and 144b and the gate electrodes 146a and 146b are respectively formed on the N-type and P-type semiconductor layers 140 and 142. Additionally, the interlayer insulating layer 124 having the semiconductor layer contact holes 147a, 147b, 147c and 147d formed therein is formed on the whole resultant substrate having the gate electrodes 146a and 146b.

Source and drain electrodes 150a, 152a, 150b and 152b are respectively formed on the interlayer insulating layer 124 to connect with the N-type and P-type semiconductor layers 140 and 142 through the semiconductor layer contact holes 147a, 147b, 147c and 147d, and the passivation layer 132 is formed on the whole resultant substrate having the source and drain electrodes 150a, 152a, 150b and 152b.

The N-type semiconductor layer 140 includes, as in the semiconductor layer 116 of FIG. 1A, an active layer 140a formed in a contact region with the gate insulating layer 144a, an N-type impurity layer 140c formed in a region including a contact region with the source and drain electrodes 150a and 152a, and an LDD layer 140b between the active layer 140a and N-type impurity layer 140c.

Hereinafter, a conventional fabrication method will be described for a general thin film transistor of the pixel and a CMOS thin film transistor of the driving circuit.

FIG. 2 is a process flow chart illustrating a conventional fabrication method of a top-gate type thin film transistor of FIGS. 1A and 1B, and this fabrication method includes a photolithography step (hereinafter, "masking process") using a photoresist (PR).

First, the insulating substrate is prepared, and the buffer layer is formed on the insulating substrate S100. For the material of the buffer layer, an inorganic insulating film such as a silicon nitride film (SiNx) or a silicon oxide film (SiOx) may be used.

Next, the active layer is formed on the buffer layer S11. In this step, the amorphous silicon (a-Si) layer is deposited to have a thickness of about 550 Å on the resultant substrate having the buffer layer formed, and then a dehydrogenation process is performed. Additionally, through a crystallization process, a crystalline silicon layer is formed such as a polycrystalline silicon layer or a single crystalline silicon layer, and then the crystalline silicon layer is used to form the active layer by a first masking process.

After that, the gate insulating layer and the gate electrode are formed S120. A silicon nitride film with a thickness of about 1000 Å and a molybdenum (Mo) film with a thickness of about 2000 Å are sequentially deposited on the resultant substrate having the active layer formed, and then through a second masking process, the gate insulating layer and the gate electrode are formed.

Next, a step is performed for completing the N-type semiconductor layer. That is, the N− doped LDD layer is formed on the resultant substrate having the gate electrode, the gate insulating layer is formed, and then through a third masking process, the N+ doped N-type impurity layer is formed S130.

Next, the P+ doped P-type impurity layer is formed on the resultant substrate having the N-type impurity layer formed therein, through a fourth masking process S140.

Further, a step is performed for forming the interlayer insulating layer S150. The inorganic insulating film with a thickness of about 7000 Å may be silicon nitride or silicon oxide and is deposited on the resultant substrate having the P-type impurity layer formed, and then through a fifth masking process, the interlayer insulating layer having the semiconductor layer contact hole is formed.

Next, molybdenum (Mo) with a thickness of about 500 Å and aluminum neodymium (AlNd) with a thickness of about 3000 Å are sequentially deposited on the resultant substrate with the interlayer insulating layer, and then through a sixth masking process, a blanket etching is performed to form the source and drain electrode to connect with the impurity layer through the semiconductor layer contact hole S160.

Further, the silicon nitride film with a thickness of about 4000 Å is deposited to form the passivation layer on the resultant substrate with the source and drain electrodes, and then a hydrogenation heat-treatment process is performed. The hydrogenation heat-treatment process may be performed once using nitrogen ($N_2$) gas at a temperature of change about 380° C.

Next, through a seventh masking process, the drain contact hole is formed in the passivation layer S170.

Finally, the pixel electrode is formed on the passivation layer S180. In this step, a layer of Indium Tin Oxide (ITO) about 500 Å thick is deposited on the resultant substrate having the passivation layer formed, and then through an eighth masking process, the pixel electrode is formed to connect with the drain electrode through the drain contact hole.

One problem as the liquid crystal display increases size and increases in resolution, the length of the lines lengthen and a width thereof are narrowed thereby resulting in increasing a probability of a signal delay.

Accordingly, there remains a need to decrease the resistance of the lines using a low resistance material.

SUMMARY OF THE INVENTION

Accordingly, the present invention is directed to a liquid crystal display and a fabrication method thereof that substantially obviates one or more problems due to limitations and disadvantages of the related art.

An advantage of the present invention is to provide an array substrate for a liquid crystal display and a fabrication method thereof in which a gate redundancy line is formed on a gate electrode and/or a gate line in a thin film transistor such that the resistance of the gate electrode and/or the gate line is decreased, and the gate electrode and gate line are prevented from being disconnected thereby being applicable to a large area liquid crystal display panel resulting in a better quality low resistance line that prevents signal delay.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, there is provided an array substrate for a liquid crystal display, the array substrate including: a substrate; a gate line and a thin film transistor having a gate electrode, a source electrode, a drain electrode and an active layer formed over the substrate; an interlayer insulating layer formed on the thin film transistor; a first gate redundancy line formed on the interlayer insulating layer, and connected electrically with one of the gate electrode and the gate line through a first gate contact hole and formed of the same material as the source and drain electrodes; a passivation layer provided on the first gate redundancy line and the interlayer insulating layer; and a pixel electrode electrically connected with the drain electrode through the drain contact hole formed in the passivation layer.

In another aspect of the present invention, there is provided an array substrate for a liquid crystal display, including: a substrate; a gate line and a thin film transistor having a gate electrode, a source electrode, a drain electrode and an active layer formed on the substrate; an interlayer insulating layer formed on the thin film transistor; a passivation layer formed on the interlayer insulating layer; a pixel electrode electrically connected with the drain electrode through a drain contact hole formed in the passivation layer; and a gate redundancy line formed on the passivation layer, and connected electrically with one of the gate electrode and the gate line through a gate contact hole and formed of the same material as the pixel electrode.

In another aspect of the present invention, there is provided a method for fabricating an array substrate for a liquid crystal display, the method including the steps of: forming a gate line and a gate electrode on a substrate; forming an interlayer insulating layer on the gate line and the gate electrode; forming a first gate redundancy line on the interlayer insulating layer and electrically connected with one of the gate electrode and the gate line through a first gate contact hole; forming a passivation layer on the first gate redundancy line and the interlayer insulating layer; and forming a drain contact hole in the passivation layer, and forming a pixel electrode connected electrically with the drain electrode through the drain contact hole.

In another aspect of the present invention, there is provided a method for fabricating an array substrate for a liquid crystal display, the method including the steps of: forming a gate line and a gate electrode on a substrate; forming an interlayer insulating layer on the gate line and the gate electrode; forming a passivation layer on the interlayer insulating layer; and forming a gate contact hole in the passivation layer, and forming a gate redundancy line connected electrically with one of the gate electrode and the gate line through the gate contact hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to embodiments of the present invention, example of which are illustrated in the accompanying drawings.

Figure 1A:
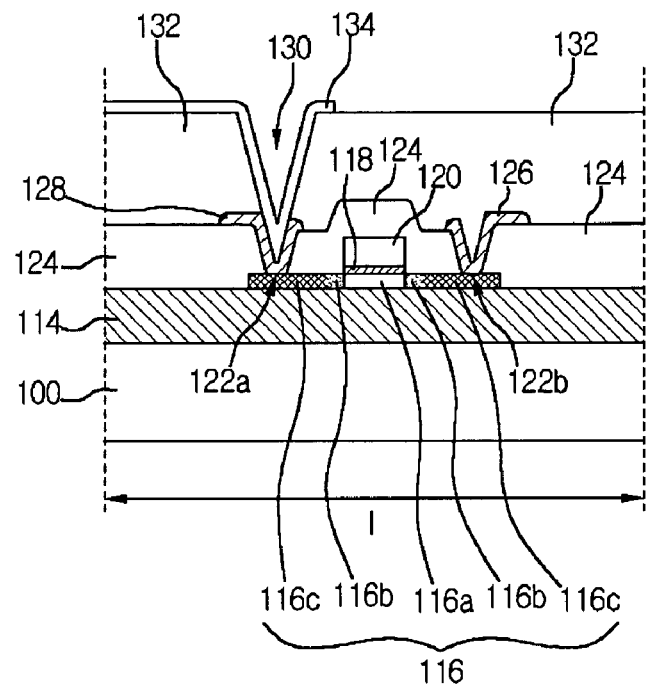
FIG. 1 is a sectional view respectively illustrating conventional top-gate type thin film transistors of a pixel part and a driving circuit part.
Figure 1B:
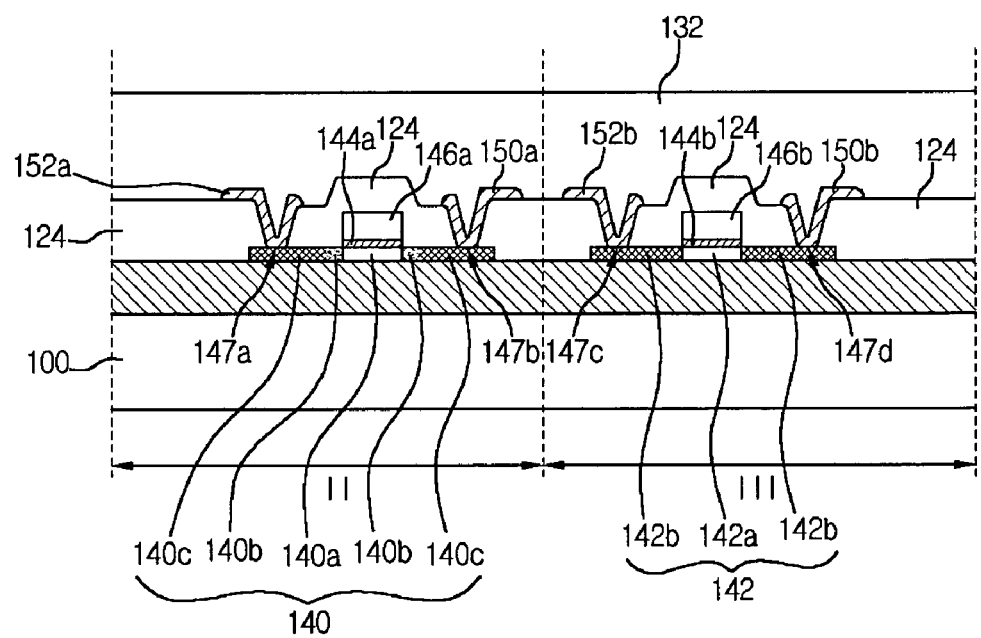
Figure 2:
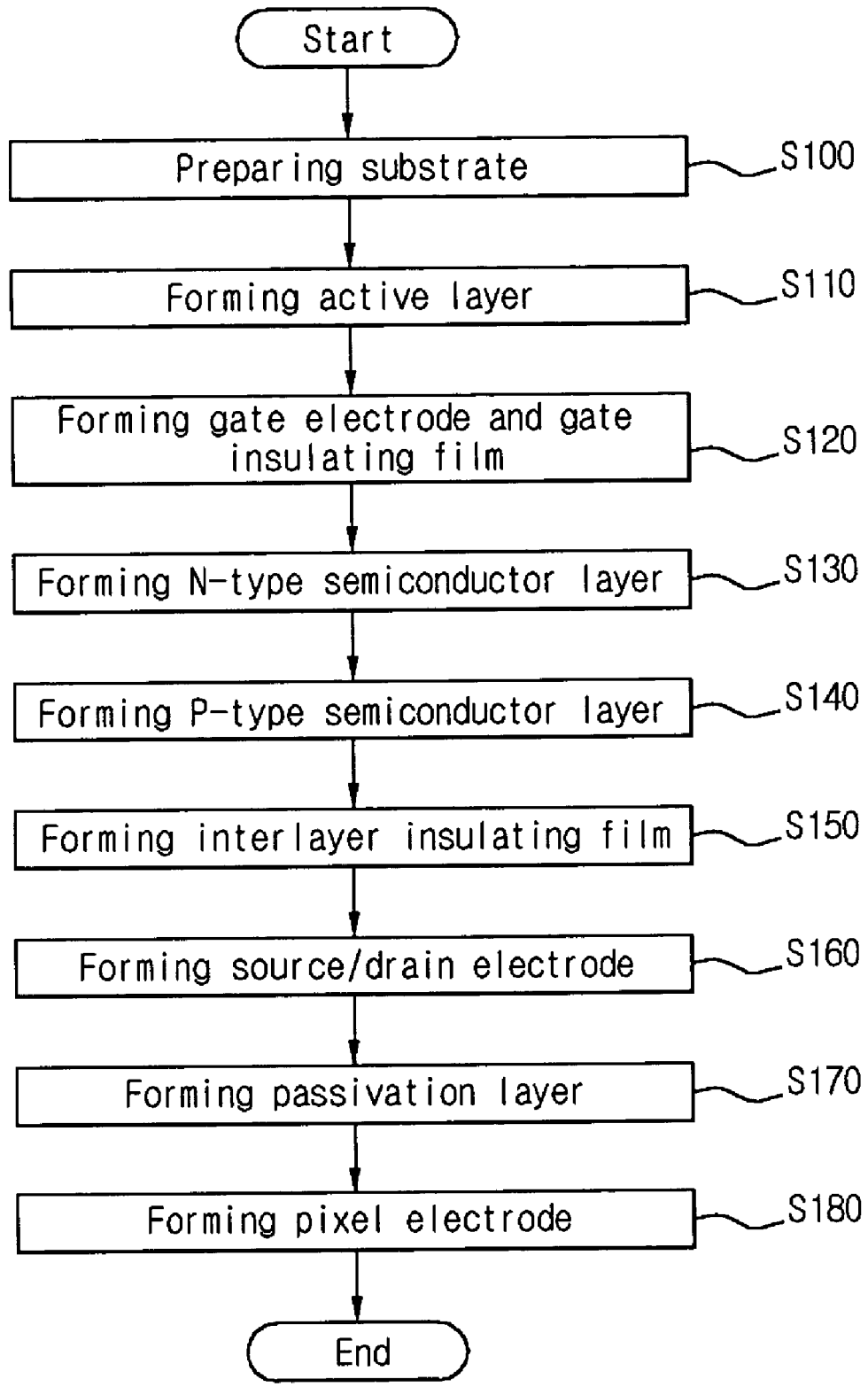
FIG. 2 is a process flow chart illustrating a conventional fabrication method of a top-gate type thin film transistor.
Figure 3:
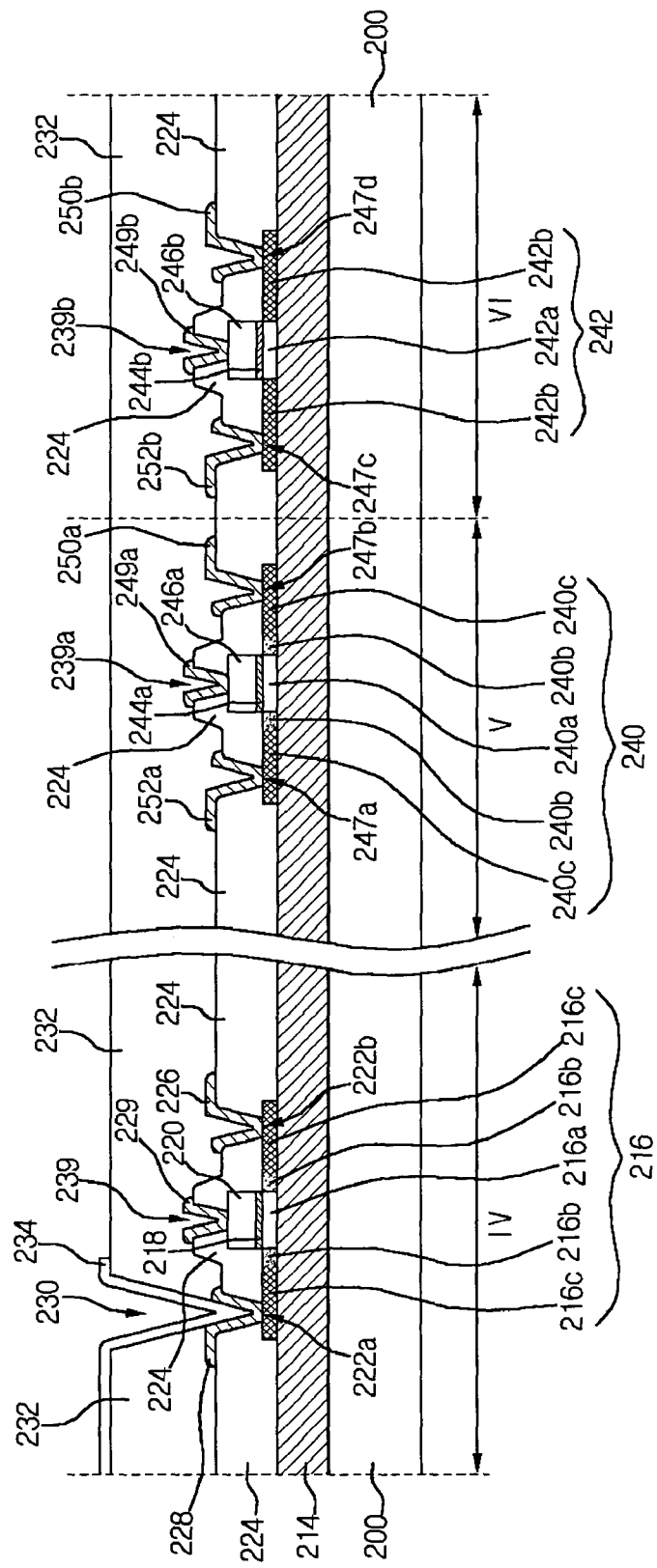
FIG. 3 is a sectional view respectively illustrating top-gate type thin film transistors of a pixel part and a driving circuit part according to a first embodiment of the present invention.

FIG. 3 is a sectional view respectively illustrating top-gate type thin film transistors of a pixel and a driving circuit according to a first embodiment of the present invention. In FIG. 3, the pixel and the driving circuit all have a top-gate type thin film transistor in which a gate electrode is positioned on a semiconductor layer.

First, as shown in FIG. 3, in a pixel thin film transistor (IV), a buffer layer 214 is formed on a whole insulating substrate 200, a semiconductor layer 216 is formed on the buffer layer 214, and then a gate insulating layer 218 and a gate electrode 220 are sequentially formed on a central portion of the semiconductor layer 216.

Further, an interlayer insulating layer 224 having first and second semiconductor layer contact holes 222a and 222b and a gate contact hole 239 formed therein is formed on the resultant substrate to cover the gate electrode 220. Additionally, source and drain electrodes 226 and 228 are formed to connect with the semiconductor layer 216 through the first and second semiconductor layer contact holes 222a and 222b.

Furthermore, a gate redundancy line 229 is formed to connect with the gate electrode 220 through the gate contact hole 239 formed in the interlayer insulating layer 224. The gate redundancy line 229 is formed at the same time that the source and drain electrodes 226 and 228 are formed and with the same material.

Additionally, a passivation layer 232 having a drain contact hole 230 is formed on the resultant substrate having the source and drain electrodes 226 and 228 and the gate redundancy line 229, and a pixel electrode 234 is formed on the passivation layer 232 to connect with the drain electrode 228 through the drain contact hole 230.

The semiconductor layer 216 includes an active layer 216a formed in a region corresponding to the gate insulating layer 218, and an $N^+$ doped N-type impurity layer 216c formed in a contact region with the source and drain electrodes 226 and 228. In a junction portion between the source and drain electrodes 226 and 228 between the active layer 216a and the N-type impurity layer 216c and the gate electrode 220, a lightly doped drain (LDD) layer 216b is formed.

The LDD layer 216b is doped with a lower concentration for the purpose of dispersing hot carriers so as to prevent a leakage current from increasing and to minimize a current loss in an ON state.

Also, as shown in FIG. 3, in the array substrate for the liquid crystal display according to the present invention, the CMOS thin film transistor of the driving circuit includes a thin film transistor (V) having an N doped channel and a thin film transistor (VI) having a P doped channel.

As illustrated, an N-type semiconductor layer 240 and a P-type semiconductor layer 242 are formed on the insulating substrate 200 having the buffer layer 214 formed. The gate insulating layers 244a and 244b and the gate electrodes 246a and 246b are formed on the N-type and P-type semiconductor layers 240 and 242. Additionally, the interlayer insulating layer 224 having the semiconductor layer contact holes 247a, 247b, 247c, and 247d and the gate contact holes 239a and 239b is formed on the whole resultant substrate having the gate electrodes 246a and 246b.

Source and drain electrodes 250a, 252a, 250b and 252b are respectively formed on the interlayer insulating layer 224 to connect with the N-type and P-type semiconductor layers 240 and 242 through the semiconductor layer contact holes 247a, 247b, 247c, and 247d. Additionally, gate redundancy lines 249a and 249b are formed to connect with the gate electrodes 246a and 246b through the gate contact holes 239a and 239b. Also, the passivation layer 232 is formed on the whole resultant substrate having the source and drain electrodes 250a, 252a, 250b and 252b and the gate redundancy lines 249a and 249b.

Herein, as in the semiconductor layer 216 of the pixel the N-type semiconductor layer 240 includes an active layer 240a formed in a contact region with the gate insulating layer 244a, an N-type impurity layer 240c formed in a region including a contact region with the source and drain electrodes 250a and 252a, and an LDD layer 240b between the active layer 240a and N-type impurity layer 240c.

Also, because the P-type semiconductor layer 242 uses a positively charged carrier, it has less carrier deterioration and a smaller leakage current than those of the N-type thin film transistor. Accordingly, the P-type semiconductor layer 242 is constructed to include a contact region with the gate insulating layer 244b as the active layer 242a and an external region of the active layer 242a as the P-type impurity layer 242b without an individual LDD layer.

In the above description, the thin film transistor having an LDD layer formed is described, but in the thin film transistor also may be formed in an offset structure not the LDD layer.

Also, in the above description, it is described that the gate redundancy line is formed on the gate electrode, but the gate redundancy line may be formed on the gate line as well as the gate electrode.

Hereinafter, for an array substrate for the liquid crystal display according to the present invention, a fabrication method of the pixel thin film transistor will be described in detail.

FIGS. 4A to 4D are views illustrating a sequence of the fabrication method of the top-gate type thin film transistor according to a first embodiment of the present invention. This fabrication method includes a photolithography process using a photoresist (PR).

Figure 4A:
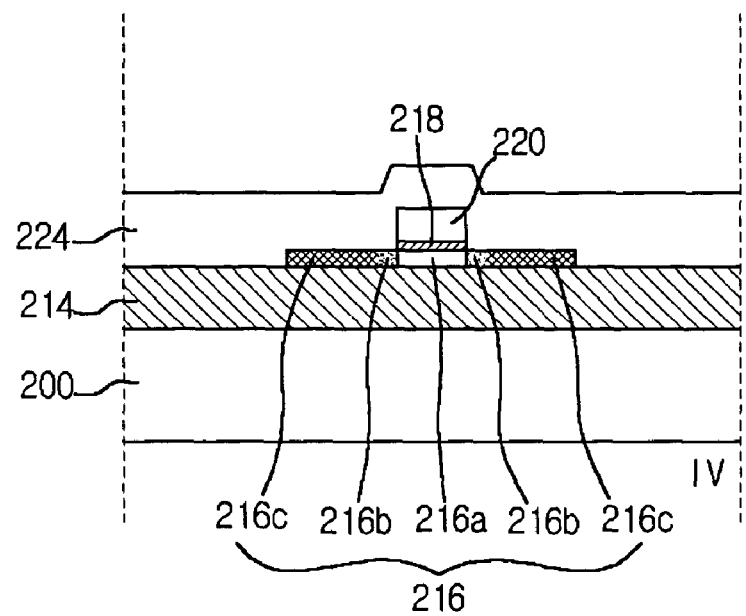
FIG. 4 is a view illustrating a sequence of a fabrication method of a top-gate type thin film transistor of FIG. 3.

First, as shown in FIG. 4A, the buffer layer 214 is formed on the insulating substrate 200. The buffer layer 214 material may be an inorganic insulating film such as a silicon nitride film (SiNx) or a silicon oxide film (SiOx).

Next, the semiconductor layer 216 is formed on the buffer layer 214. In this step, the amorphous silicon (a-Si) is deposited with a thickness of about 550 Å on the resultant substrate having the buffer layer 214 formed, and then a dehydrogenation process is performed. Additionally, a crystallization process forms a crystalline silicon layer such as a polycrystalline silicon layer or a single crystalline silicon layer, and then the crystalline silicon layer is used to form the semiconductor layer 216 by a first masking process.

Further, the gate insulating layer 218 and the gate electrode 220 are sequentially formed.

A silicon nitride film or a silicon oxide film with a thickness of about 1000 Å is sequentially deposited to form the gate insulating layer 218 on the resultant substrate having the semiconductor layer 216. Then, molybdenum (Mo) with a thickness of about 2000 Å is deposited and, the gate electrode 220 is formed by a second masking process.

Next, a step is performed for completing the N-type semiconductor layer. The $N^-$ doped LDD layer 216b is formed on the resultant substrate having the gate electrode 220 and the gate insulating layer 218, and then through a third masking process, the $N^+$ doped N-type impurity layer 216c is formed.

Next, the P+ doped P-type impurity layer (not shown in the drawing, but used to form the driving circuit thin film transistor) is formed on the resultant substrate having the N-type impurity layer 216c formed therein.

Further, a step is performed for forming the interlayer insulating layer 224. The inorganic insulating film with a thickness of about 7000 Å may be silicon nitride or silicon oxide and is deposited on the resultant substrate.

Figure 4B:
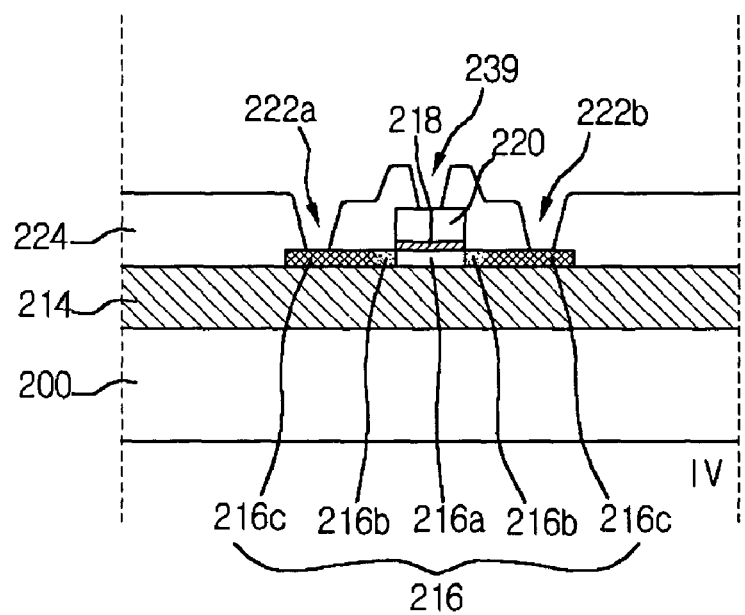

Next, as shown in FIG. 4B, the semiconductor layer contact holes 222a and 222b and the gate contact hole 239 are formed in the interlayer insulating layer 224 using a fifth masking process.

Further, aluminum neodymium (AlNd) with a thickness of about 3000 Å and molybdenum (Mo) with a thickness of about 500 Å are deposited to form a metallic layer on the resultant substrate having the interlayer insulating layer 224 including the semiconductor layer contact holes 222a and 222b and the gate contact hole 239. The metallic layer also may be formed to include Mo/Al/Mo, and also instead of aluminum, an aluminum alloy may be used.

Figure 4C:
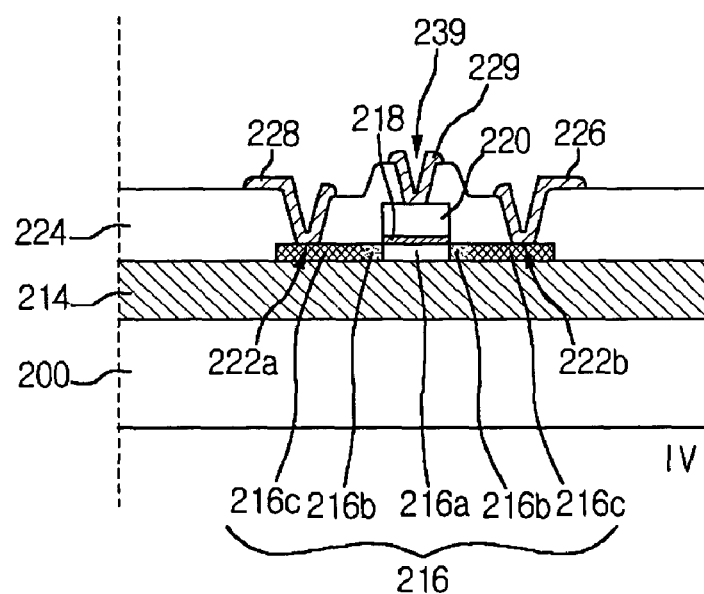

Next, a blanket etching process is performed by a sixth masking process. Accordingly, as shown in FIG. 4C, the source and drain electrodes 226 and 228 are formed to connect with the impurity layer through the semiconductor layer contact holes 222a and 222b. Additionally, the gate redundancy line 229 is formed of the same material as the source and drain electrodes 226 and 228, to connect with the gate electrode 220 through the gate contact hole 239.

Figure 4D:
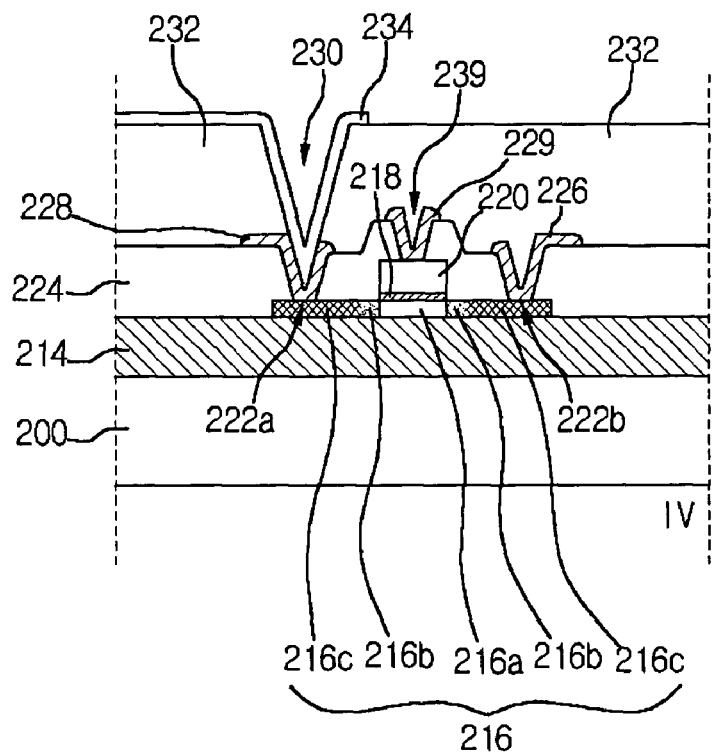

Additionally, as shown in FIG. 4D, a silicon nitride film or silicon oxide film about 4000 Å thick is deposited to form the passivation layer 232 on the resultant substrate having the source and drain electrodes 226 and 228 and the gate redundancy line 229 formed.

Next, the hydrogenation heat-treatment step is performed. The hydrogenation heat-treatment step may be performed once at a temperature of about 380° C. using nitrogen ($N_2$) gas.

Next, through a seventh masking process, the drain contact hole 230 is formed in the passivation layer 232, and the pixel electrode 234 is formed on the passivation layer 232. In this step, ITO with a thickness of about 500 Å is deposited on the resultant substrate having the passivation layer 232 formed, by an eighth masking process, the pixel electrode 234 is formed to connect with the drain electrode 228 through the drain contact hole 230.

Accordingly, the present invention may, by the gate redundancy line, lower the resistance of the gate electrode and the gate line and prevent the gate electrode and the gate line from being disconnected, thereby improving response speed and providing good image quality in the liquid crystal display.

Figure 5:
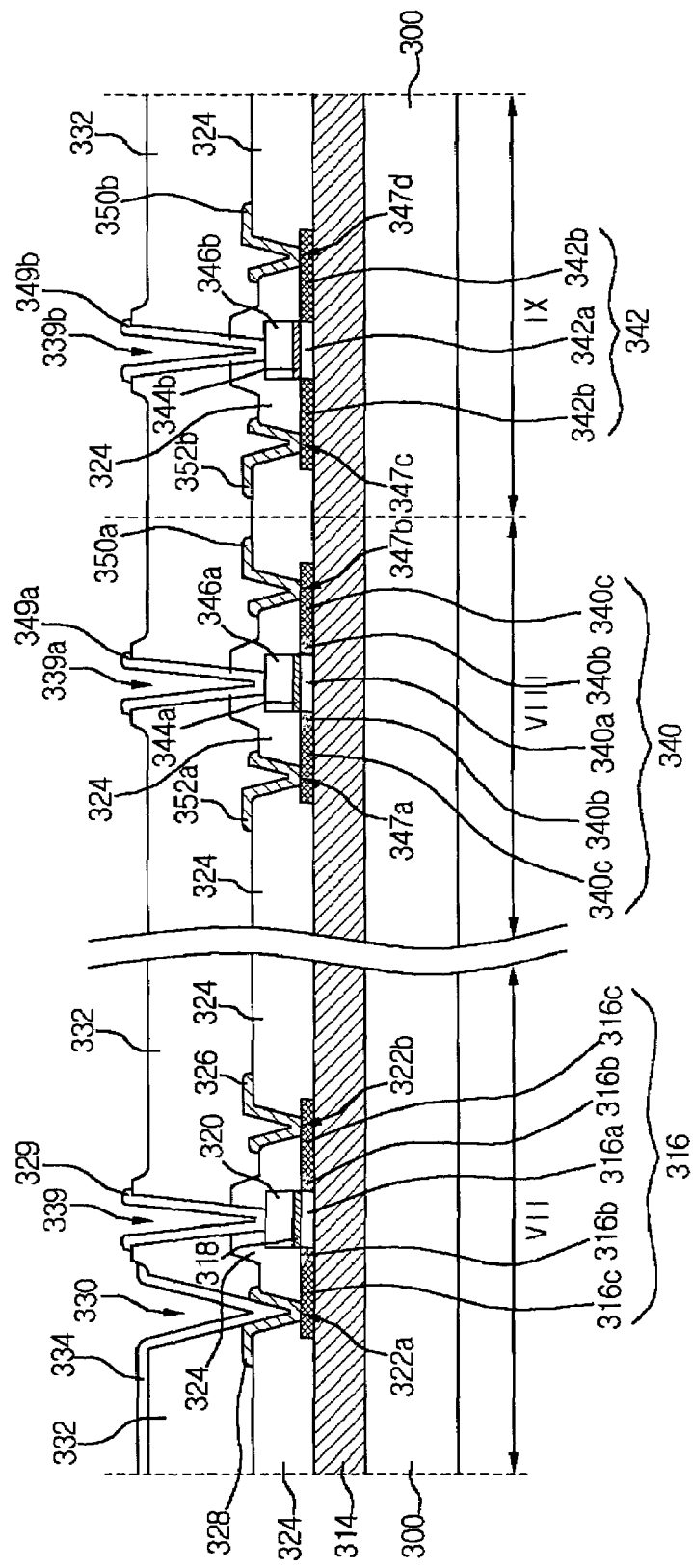
FIG. 5 is a sectional view respectively illustrating top-gate type thin film transistors of a pixel part and a driving circuit part according to a second embodiment of the present invention.

FIG. 5 is a sectional view respectively illustrating the pixel thin film transistor (VII) and a driving circuit CMOS thin film transistor (VIII) and (IX) according to a second embodiment of the present invention. In FIG. 5, a pixel and a driving circuit all have a top-gate type thin film transistor in which a gate electrode is positioned on a semiconductor layer.

First, as shown in FIG. 5, in a pixel thin film transistor (VII), a buffer layer 314 is formed on a whole insulating substrate 300, a semiconductor layer 316 is formed on the buffer layer 314, and then a gate insulating layer 318 and a gate electrode 320 are sequentially formed on a central portion of the semiconductor layer 316.

Further, an interlayer insulating layer 324 having first and second semiconductor layer contact holes 322a and 322b formed therein is formed on the resultant substrate having the gate electrode 320. Additionally, source and drain electrodes 326 and 328 are formed to connect with the semiconductor layer 316 through the first and second semiconductor layer contact holes 322a and 322b.

Additionally, a passivation layer 332 having the drain contact hole 330 and the gate contact hole 339 therein is formed on the resultant substrate having the source and drain electrodes 326 and 328 and the gate electrode 320 formed. Also, a pixel electrode 334 is formed on the passivation layer 332 to connect with the drain electrode 328 through the drain contact hole 330.

The passivation layer 332 and the interlayer insulating layer 324 formed on the gate electrode 320 are etched to form the gate contact hole 339.

At the same time that the pixel electrode 334 is formed on the passivation layer 332, a gate redundancy line 329 is formed of the same material. Accordingly, the gate redundancy line 329 is in contact with the gate electrode 320 through the gate contact hole 339.

The semiconductor layer 316 includes an active layer 316a in a region corresponding to the gate insulating layer 318, and an $N^+$ doped N-type impurity layer 316c in a contact region with the source and drain electrodes 326 and 328. In a junction portion between the source and drain electrodes 326 and 328 between the active layer 316a and the N-type impurity layer 316c and the gate electrode 320, a lightly doped drain (LDD) layer 316b is formed.

The LDD layer 316b is doped with a lower concentration for the purpose of dispersing hot carriers so as to prevent a leakage current from increasing and to minimize a current loss in an ON state.

Also, as shown in FIG. 5, the CMOS thin film transistor of the driving circuit includes a thin film transistor (VIII) having an N doped channel and a thin film transistor (IX) having a P doped channel.

As illustrated, an N-type semiconductor layer 340 and a P-type semiconductor layer 342 are formed on the insulating substrate 300 having the buffer layer 314 formed. The gate insulating layers 344a and 344b and the gate electrodes 346a and 346b are respectively formed on the N-type and P-type semiconductor layers 340 and 342. Additionally, the interlayer insulating layer 324 having the semiconductor layer contact holes 347a, 347b, 347c and 347d formed therein is formed on the whole resultant substrate having the gate electrodes 346a and 346b.

Source and drain electrodes 350a, 352a, 350b, and 352b are respectively formed on the interlayer insulating layer 324 to respectively connect with the N-type and P-type semiconductor layers 340 and 342 through the semiconductor layer contact holes 347a, 347b, 347c, and 347d. Additionally, the passivation layer 332 is formed on the resultant substrate having the source and drain electrodes 350a, 352a, 350b, and 352b.

Herein, the gate contact holes 339a and 339b passing through the passivation layer 332 and the interlayer insulating layer 324 are simultaneously formed when the drain contact hole 330 is formed in the pixel part thin film transistor. Also, when the pixel electrode 334 is formed in the pixel thin film transistor, the gate redundancy lines 349a and 349b are simultaneously formed of the same material.

As in the semiconductor layer 316 of the pixel part, the N-type semiconductor layer 340 includes an active layer 340a formed in a contact region with the gate insulating layer 344a, an N-type impurity layer 340c formed in a region including a contact region with the source and drain electrodes 350a and 352a, and an LDD layer 340b formed between the active layer 340a and N-type impurity layer 340c.

Also, because the P-type semiconductor layer 342 uses a positively charged carrier, it has less carrier deterioration and smaller leakage current than those of the N-type thin film transistor. Accordingly, the P-type semiconductor layer 342 is constructed to include a contact region with the gate insulating layer 344b as the active layer 342a, and an external region of the active layer 342a as the P-type impurity layer 342b without an individual LDD layer.

Hereinafter, for an array substrate for the liquid crystal display according to the present invention, the fabrication method of the pixel thin film transistor will be described in detail.

FIGS. 6A to 6D are views illustrating a sequence of the fabrication method of the top-gate type pixel thin film transistor according to a second embodiment of the present invention. This fabrication method includes a photolithography process using a photoresist (PR).

Figure 6A:
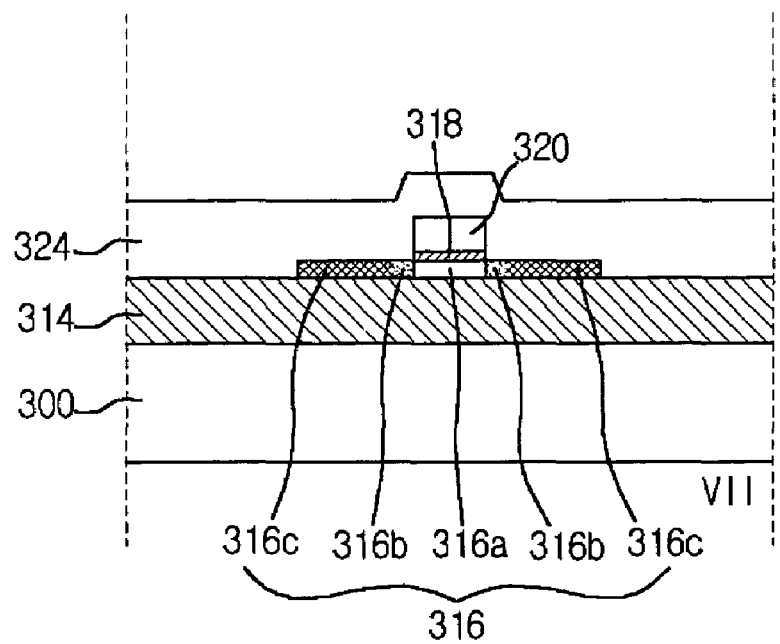
FIG. 6 is a view illustrating a sequence of a fabrication method of a top-gate type thin film transistor of FIG. 5.

First, as shown in FIG. 6A, the buffer layer 314 is formed on the insulating substrate 300. The buffer layer material may be an inorganic insulating film such as a silicon nitride film (SiNx) or a silicon oxide film (SiOx).

Next, the semiconductor layer 316 is formed on the buffer layer 314. In this step, the amorphous silicon (a-Si) layer is deposited with a thickness of about 550 Å on the resultant substrate having the buffer layer 314 formed, and then a dehydrogenation process is performed. Additionally, a crystallization process forms a crystalline silicon layer such as a polycrystalline silicon layer or a single crystalline silicon layer, and then the crystalline silicon layer is used to form the semiconductor layer 316 by a first masking process.

Further, the gate insulating layer 318 and the gate electrode 320 are sequentially formed.

A silicon nitride film or a silicon oxide film with a thickness of about 1000 Å is sequentially deposited to form the gate insulating layer 318 on the resultant substrate having the semiconductor layer 316. Then molybdenum (Mo) with a thickness of about 2000 Å is deposited, and by a second masking process, the gate electrode 320 is formed.

Next, a step is performed for completing the N-type semiconductor layer 316. The N⁻ doped LDD layer 316b is formed on the resultant substrate having the gate electrode 320 and the gate insulating layer 318, and then through a third masking process, the N⁺ doped N-type impurity layer 316c is formed.

Next, the P+ doped P-type impurity layer (not shown) is formed on the resultant substrate having the N-type impurity layer 316c formed therein.

Further, a step is performed for forming the interlayer insulating layer 324. The inorganic insulating film with thickness of about 7000 Å may be silicon nitride or the silicon oxide and is deposited on the resultant substrate having the P-type impurity layer formed therein.

Figure 6B:
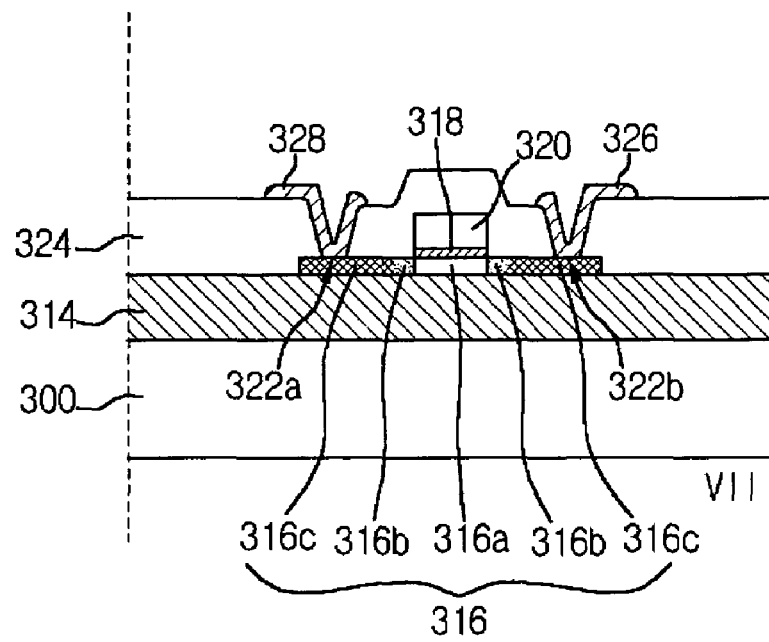

Next, as shown in FIG. 6B, the semiconductor layer contact holes 322a and 322b are formed in the interlayer insulating layer 324 using a fifth masking process.

Further, aluminum neodymium (AlNd) with a thickness of about 3000 Å and molybdenum (Mo) with a thickness of about 500 Å are deposited to form a metallic layer on the resultant substrate having the interlayer insulating layer 324 including the semiconductor layer contact holes 322a and 322b. The metallic layer also may be formed to include Mo/Al/Mo, and also instead of aluminum, an aluminum alloy may be used.

Next, a blanket etching process is performed by a sixth masking process. Accordingly, the source and drain electrodes 326 and 328 are formed to connect with the impurity layer 316c through the semiconductor layer contact holes 322a and 322b.

Figure 6C:
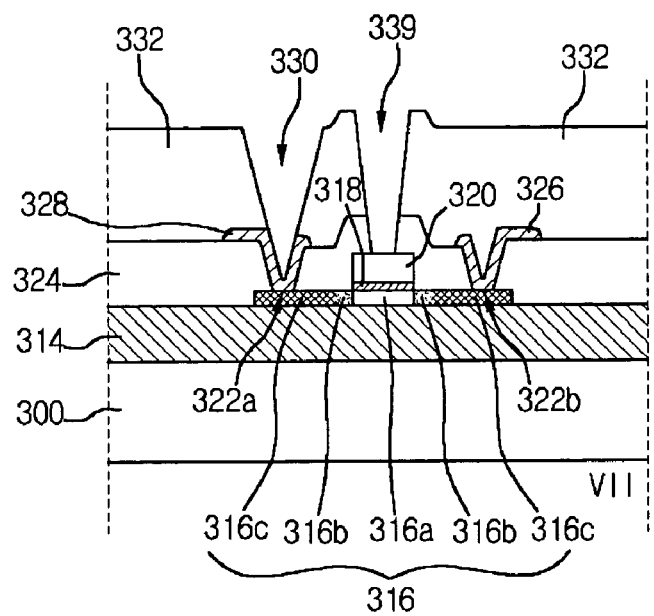

Additionally, as shown in FIG. 6C, a silicon nitride film or silicon oxide film about 4000 Å thick is deposited to form the passivation layer 332 on the resultant substrate having the source and drain electrodes 326 and 328 formed.

Next, the hydrogenation heat-treatment step is performed. The hydrogenation heat-treatment step may be performed once at a temperature of about 380° C. using nitrogen ($N_2$) gas.

Next, through a seventh masking process, the drain contact hole 330 and the gate contact hole 339 are formed in the passivation layer 332. The drain contact hole 330 and the gate contact hole 339 are simultaneously formed using one mask. The gate contact hole 339 is formed by etching the passivation layer 332 and the interlayer insulating layer 324 to expose an upper surface of the gate electrode 320.

Figure 6D:
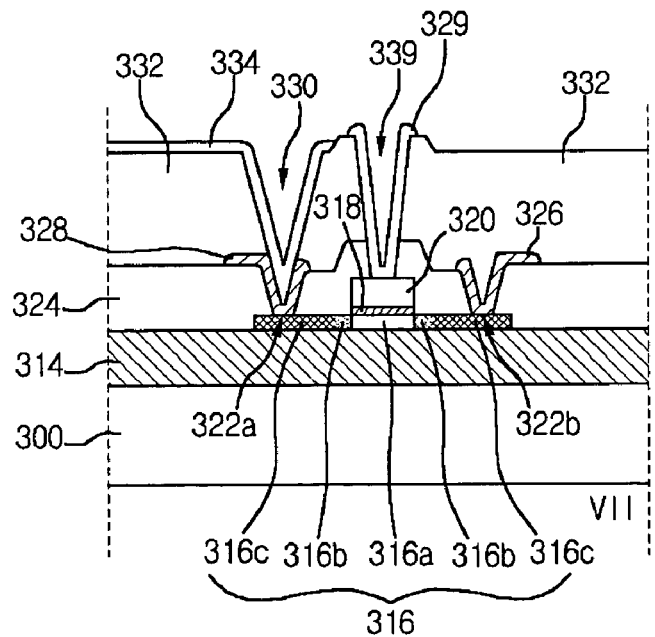

Finally, as shown in FIG. 6D, the pixel electrode 334 is formed on the passivation layer 332. In this step, ITO with a thickness of about 500 Å is deposited on the resultant substrate having the passivation layer 332 formed, and the pixel electrode 334 is formed to connect with the drain electrode 328 through the drain contact hole 330 by an eighth masking process.

When the pixel electrode 334 is formed in the pixel thin film transistor, the gate redundancy line 329 is simultaneously formed of the same material. Accordingly, the gate redundancy line 329 is in contact with the gate electrode 320 through the gate contact hole 339.

As described above, the present invention can, by the gate redundancy line, prevent the gate electrode and the gate line from being disconnected to thereby provide a good quality of image in the liquid crystal display. Additionally, in the above description, it is illustrated that the gate redundancy line is formed on the gate electrode, however the gate redundancy line may be formed on the gate line as well as the gate electrode.

On the other hand, the present invention is also applicable to a liquid crystal display including a bottom-gate type thin film transistor as well as the liquid crystal display including the top-gate type thin film transistor. With reference to the attached drawing, an array substrate including the bottom-gate type thin film transistor using the poly crystalline silicon, and a fabrication method thereof according to the present invention will be described in another embodiment.

Figure 7:
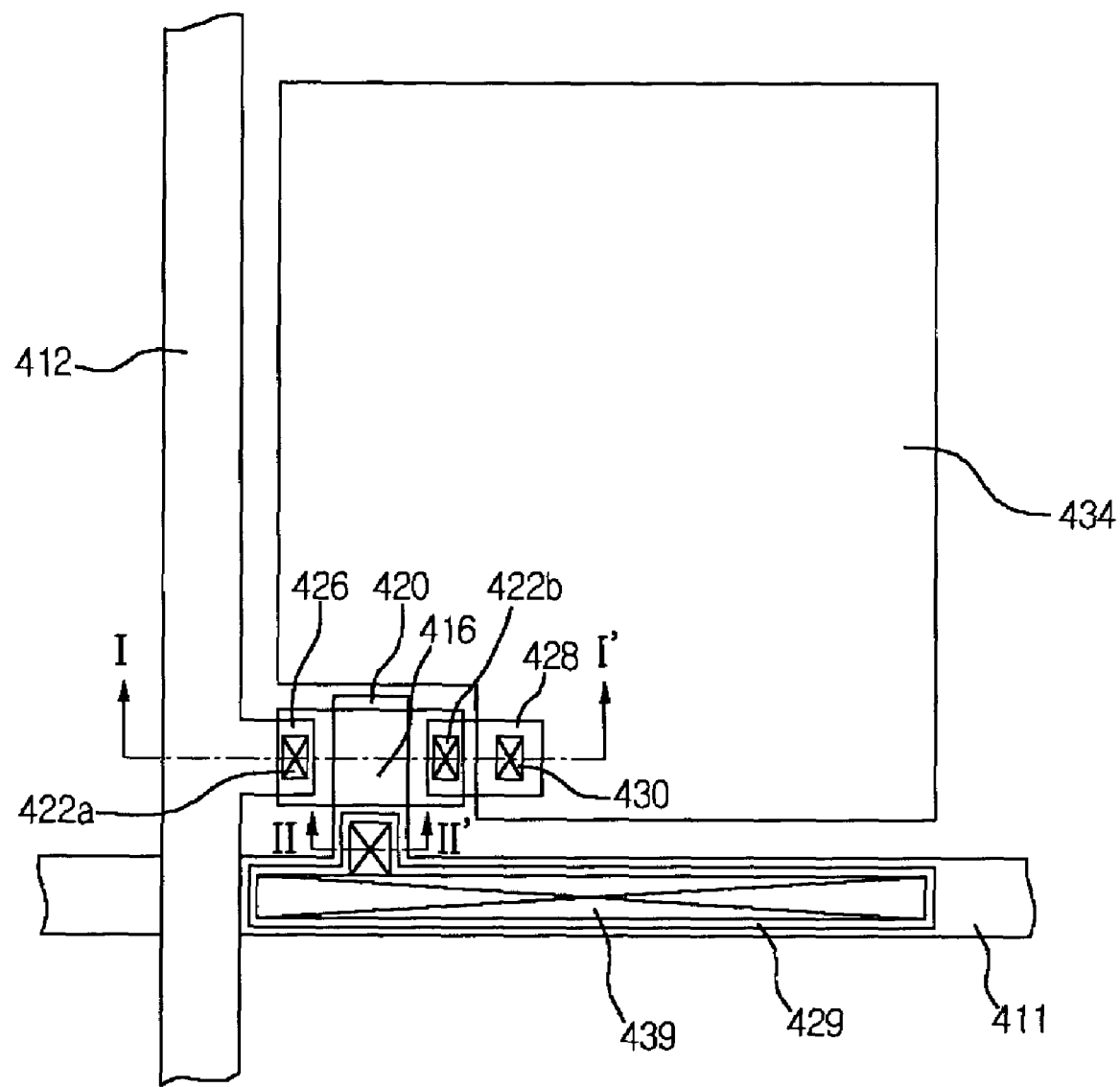
FIG. 7 is a schematic plane view illustrating a portion of a pixel region in an array substrate including a bottom-gate type thin film transistor according to a third embodiment of the present invention.

FIG. 7 is a schematic plane view illustrating a portion of a pixel region in an array substrate including a bottom-gate type thin film transistor according to a third embodiment of the present invention.

As shown in FIG. 7, a matrix type of a pixel region is defined on a transparent substrate by a plurality of gate lines 411 arranged in parallel with one another and a plurality of data lines 412 arranged in parallel with one another substantially perpendicular to the gate lines 411. Additionally, at a crossing point of two lines 411 and 412, a thin film transistor including a semiconductor layer 416, a gate electrode 420, and source and drain electrodes 426 and 428 is provided. Also, a pixel electrode 434 is further provided to electrically connect to the thin film transistor.

The semiconductor layer 416 is electrically connected with the source and drain electrodes 426 and 428 by first and second semiconductor layer contact holes 422a and 422b. Further, the drain electrode 428 and the pixel electrode 434 are electrically connected with each other by the drain contact hole 430.

Additionally, a gate redundancy line 429 is connected with the gate electrode 420 and the gate line 411 through the gate contact hole 439. The gate redundancy line 429 is, at the time of forming the source and drain electrodes 426 and 428, formed of the same material on the gate electrode 420 and the gate line 411. The gate contact hole 439 formed on the gate electrode 420 is located in a region where the semiconductor layer 416 is not formed.

Figure 8A:
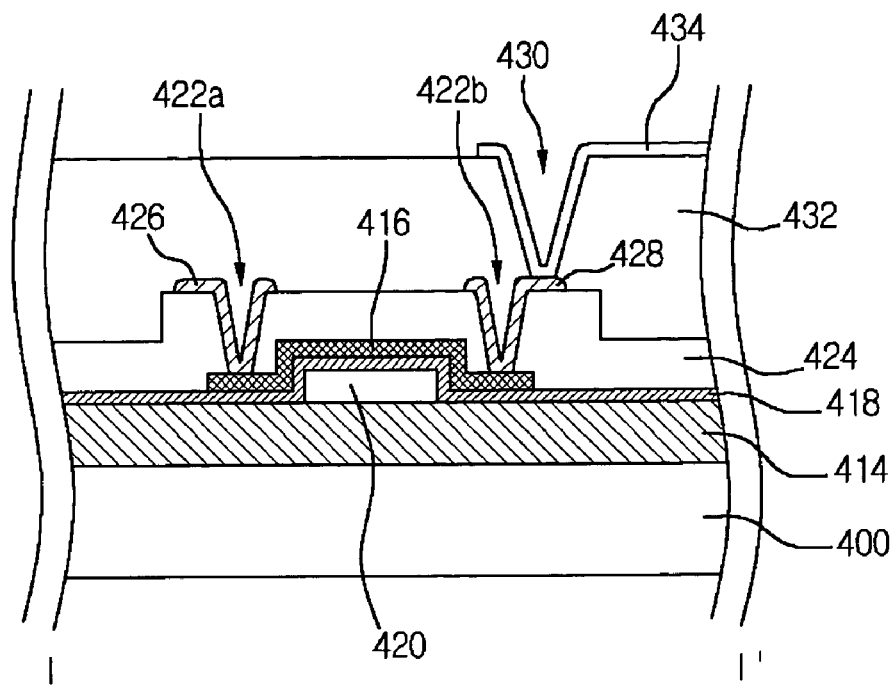
FIGS. 8A and 8B are respective sectional views, taken along lines I-I' and II-II' of FIG. 7.
Figure 8B:
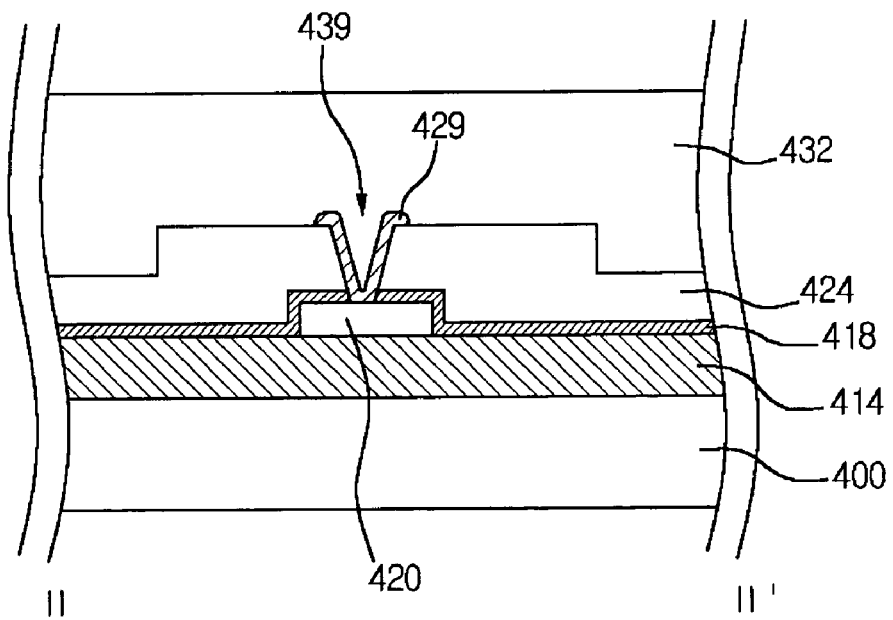

FIGS. 8A and 8B are respective sectional views, taken along lines I-I' and II-II' of FIG. 7, and schematically illustrate a portion of the pixel region in the array substrate including the bottom-gate type thin film transistor according to the present invention.

As shown in FIG. 8A taken along line I-I' of FIG. 7, a buffer layer 414 is formed on a whole insulating substrate 400, and a gate electrode 420 is formed on the buffer layer 414. Further, a gate insulating layer 418 is formed covering the resultant substrate having the gate electrode 420, and a semiconductor layer 416 is formed on the gate insulating layer 418.

An interlayer insulating layer 424 is further formed having first and second semiconductor contact holes 422a and 422b therein and covering the resultant substrate having the semiconductor layer 416. Also, source and drain electrodes 426 and 428 are formed to respectively connect with the semiconductor layer 416 through the first and second semiconductor layer contact holes 422a and 422b.

On the other hand, in the present invention, when the first and second semiconductor layer contact holes 422a and 422b are formed, the gate contact hole (not shown in FIG. 8A, but referring to a reference numeral 439 of FIG. 8B) is simultaneously formed in the interlayer insulating layer 424.

Additionally, a passivation layer 432 having the drain contact hole 430 therein is formed on the resultant substrate having the source and drain electrodes 426 and 428. Also, the pixel electrode 434 is formed on the passivation layer 432 to connect with the drain electrode 428 through the drain contact hole 430.

In the meanwhile, as shown in FIG. 8B taken along line II-II' of FIG. 7, the buffer layer 414 is formed on the whole insulating substrate 400, and the gate electrode 420 is formed on the buffer layer 414.

Further, the gate insulating layer 418 is formed on the resultant substrate having the gate electrode 420, and the interlayer insulating layer 424 is formed on the resultant substrate having the gate insulating layer 418.

Additionally, the gate redundancy line 429 is formed to connect with the gate electrode 420 through the gate contact hole 439 formed in the interlayer insulating layer 424 and the gate insulating layer 418. The gate redundancy line 429 is formed at the same time as the source and drain electrodes and of the same material.

Accordingly, the present invention can, by the gate redundancy line, lower the resistance of the gate electrode and the gate line and prevent the gate electrode and the gate line from being disconnected, thereby improving the response speed and image quality of the liquid crystal display. The fabrication method of the liquid crystal display including the bottom-gate type thin film transistor according to the present invention is similar with those of the first and second embodiments.

Figure 9:
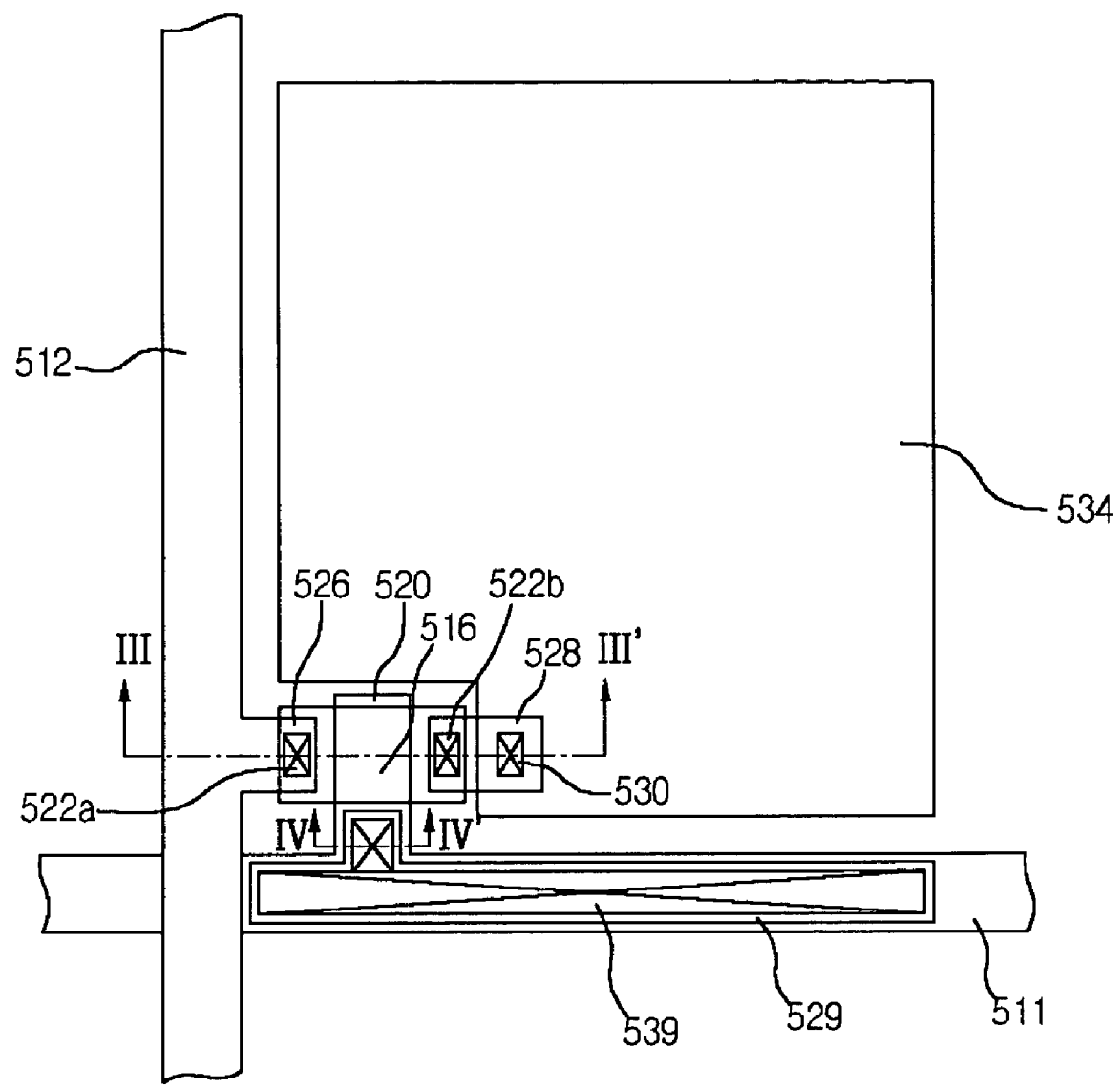
FIG. 9 is a schematic plane view illustrating a portion of a pixel region in an array substrate including a bottom-gate type thin film transistor according to a fourth embodiment of the present invention.

FIG. 9 is a schematic plane view illustrating a portion of the pixel region in an array substrate including a bottom-gate type thin film transistor according to a fourth embodiment of the present invention.

As shown in FIG. 9, a matrix type of a pixel region is defined on a transparent substrate by a plurality of gate lines 511 arranged in parallel with one another and a plurality of data lines 512 arranged in parallel with one another substantially perpendicular to the gate line 511. Additionally, at a crossing point of two lines 511 and 512, a thin film transistor including a semiconductor layer 516, a gate electrode 520, and source and drain electrodes 526 and 528 is provided. Also, a pixel electrode 534 is further provided to electrically connect to the thin film transistor.

The source and drain electrodes 526 and 528 are electrically connected with the semiconductor layer 516 through first and second semiconductor layer contact holes 522a and 522b, and the drain electrode 528 and the pixel electrode 534 are electrically connected with each other by the drain contact hole 530.

Additionally, a gate redundancy line 529 is connected with the gate electrode 520 and the gate line 511 through the gate contact hole 539. The gate redundancy line 529 is, at the same time of forming the pixel electrode 534, formed of the same material. The gate contact hole 539 formed on the gate electrode 520 is located in a region where the semiconductor layer 516 is not formed.

Figure 10A:
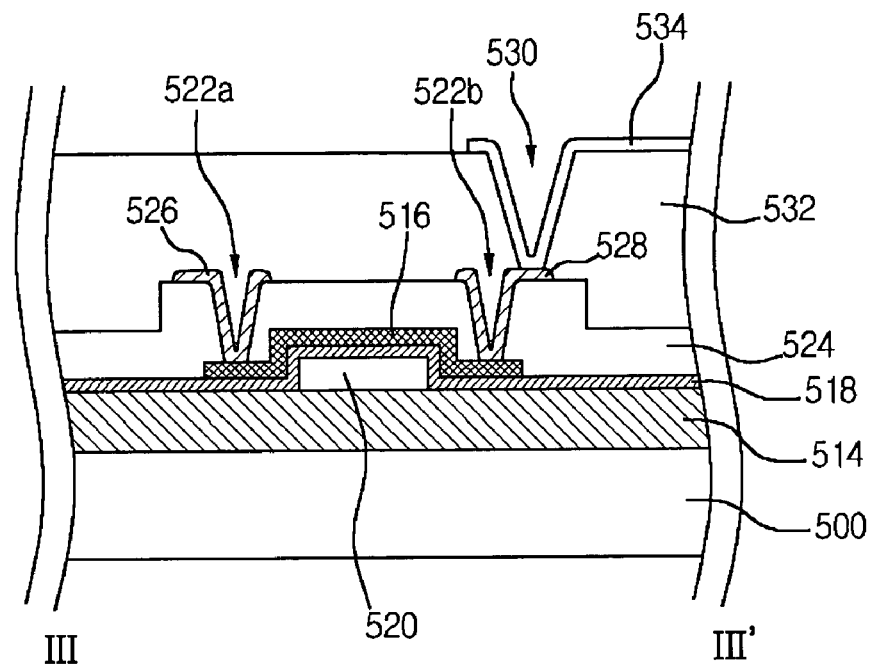
FIGS. 10A and 10B are respective sectional views, taken along lines III-III' and IV-IV' of FIG. 9.
Figure 10B:
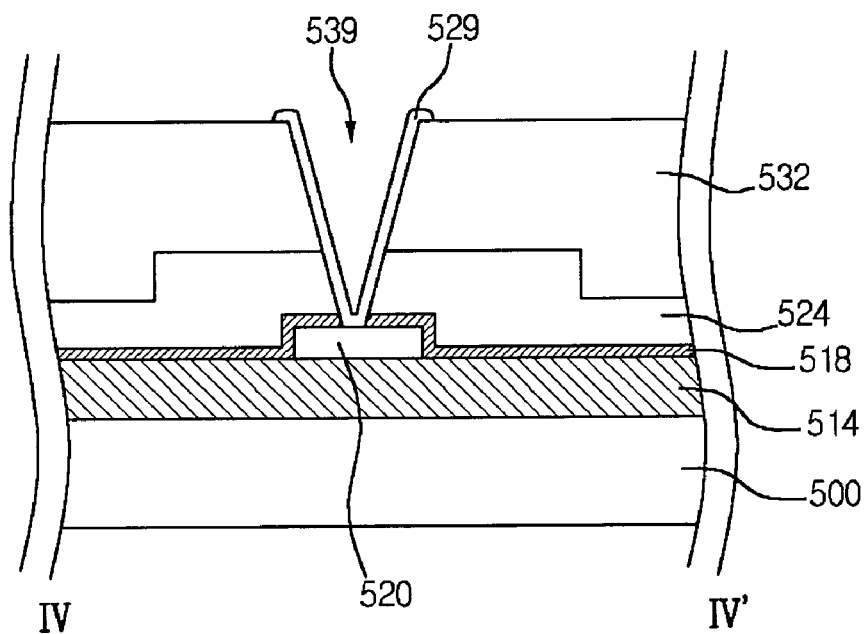

FIGS. 10A and 10B are respective sectional views taken along lines III-III' and IV-IV' of FIG. 9, and schematically illustrate a portion of a pixel region in an array substrate including the bottom-gate type thin film transistor according to the present invention.

As shown in FIG. 10A taken along line III-III' of FIG. 9, a buffer layer 514 is formed on a whole insulating substrate 500, and a gate electrode 520 is formed on the buffer layer 514. Further, a gate insulating layer 518 is formed covering the resultant substrate having the gate electrode 520, and a semiconductor layer 516 is formed on the gate insulating layer 518.

An interlayer insulating layer 524 is further formed having first and second semiconductor contact holes 522a and 522b and covering the resultant substrate having the semiconductor layer 516. Also, source and drain electrodes 526 and 528 are formed to respectively connect with the semiconductor layer 516 through the first and second semiconductor layer contact holes 522a and 522b.

Additionally, a passivation layer 532 including the drain contact hole 530 is formed on the resultant substrate having the source and drain electrodes 526 and 528. Also, the pixel electrode 534 is formed on the passivation layer 532 to connect with the drain electrode 528 through the drain contact hole 530. The drain contact hole 530 and the gate contact hole (not shown in FIG. 10A, but referring to a reference numeral 539 of FIG. 10B) are simultaneously formed using one mask.

Additionally, as shown in FIG. 10B taken along line IV-IV' of FIG. 9, the buffer layer 514 is formed on the whole insulating substrate 500, and the gate electrode 520 is formed on the buffer layer 514.

Further, the gate insulating layer 518 is formed on the resultant substrate having the gate electrode 520, and the interlayer insulating layer 524 is formed on the gate insulating layer 518. Also, the passivation layer 532 is formed on the interlayer insulating layer 524.

Additionally, the gate redundancy line 529 is formed to connect with the gate electrode 520 through the gate contact hole 539 formed passing through the passivation layer 532, the interlayer insulating layer 524 and the gate insulating layer 518. The gate redundancy line 529 is formed at the same time as the pixel electrode and formed of the same material.

Accordingly, the present invention can, by the gate redundancy line, prevent the gate electrode and the gate line from being disconnected thereby providing improved image quality in the liquid crystal display. The fabrication method of the liquid crystal display including the bottom-gate type thin film transistor according to the present invention is similar with those of the first and second embodiments.

Further, in the above-described embodiments according to the present invention, the method is described in which, when the source and drain electrodes are formed, the same material is used to form the gate redundancy line, or when the pixel electrode is formed, the same material is used to form the gate redundancy line. However, in the present invention, a dual gate redundancy line can be formed in which, when the source and drain electrodes are formed, a first gate redundancy line is formed, and when the pixel electrode is formed, a second gate redundancy line is overlapped to be formed on the first gate redundancy line.

Also, as shown in FIGS. 11A to 11D, in the array substrate for the liquid crystal display according to the present invention, various types of contact holes may be realized which are provided on the gate electrode and/or the gate line and on which the gate redundancy line is formed.

Figure 11A:
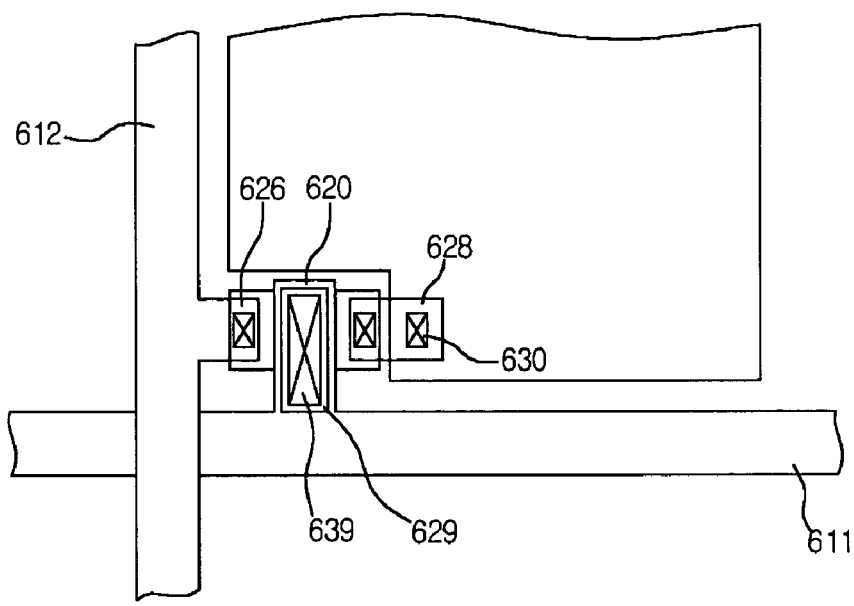
FIGS. 11A to 11D are views illustrating various types of contact holes for forming a gate redundancy line on a gate electrode and a gate line according to other embodiments of the present invention.
Figure 11B:
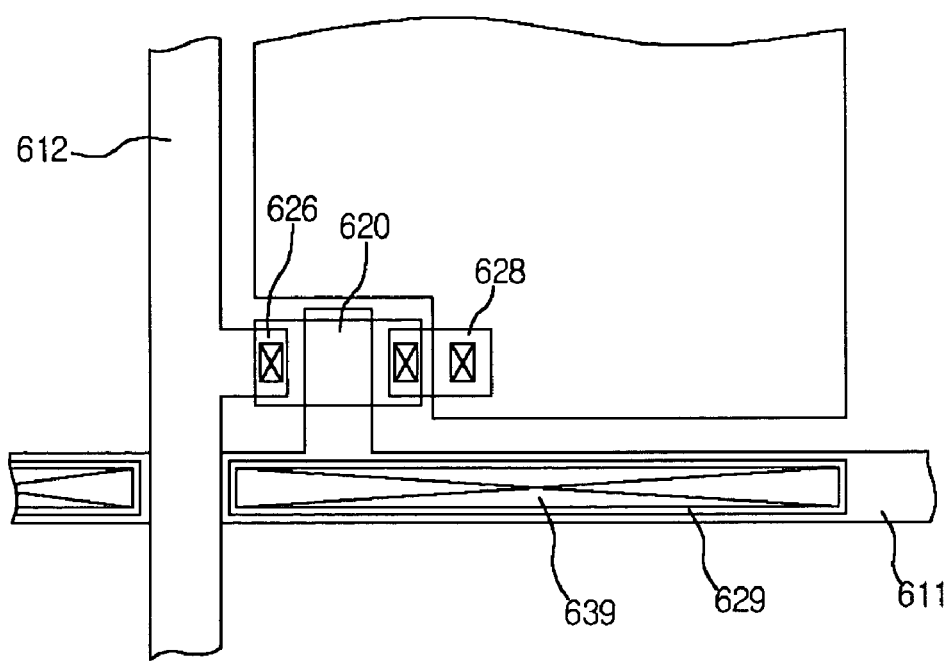
Figure 11C:
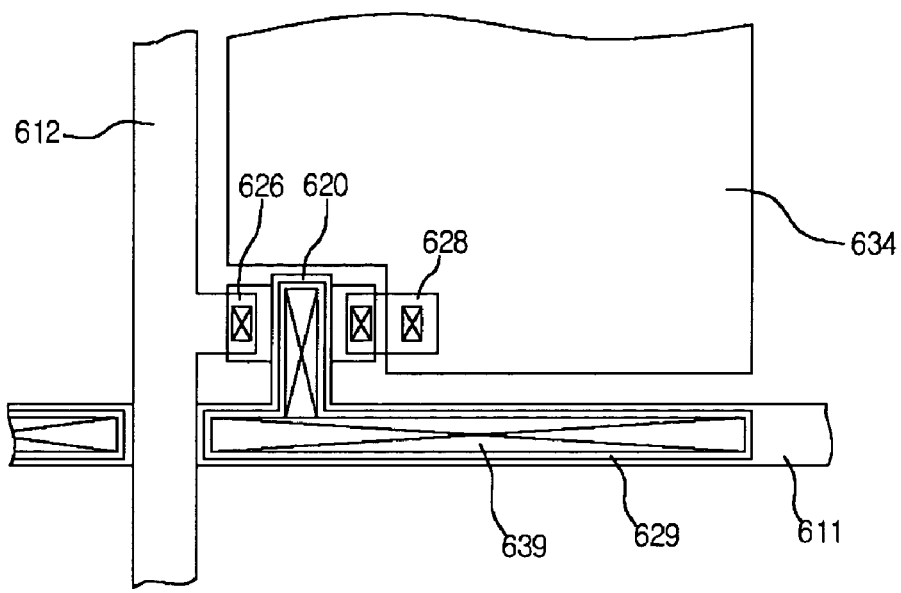

In other words, as shown in FIG. 11A, the contact hole 639 for connection of a gate redundancy line 629 may be formed only on a gate electrode 620. Additionally, as shown in FIG. 11B, the contact hole 639 for connection of the gate redundancy line 629 may be formed only on the gate line 611. Further, as shown in FIG. 11C, the contact hole 639 for connection of the gate redundancy line 629 may also be formed all on the gate electrode 620 and the gate line 611.

Figure 11D:
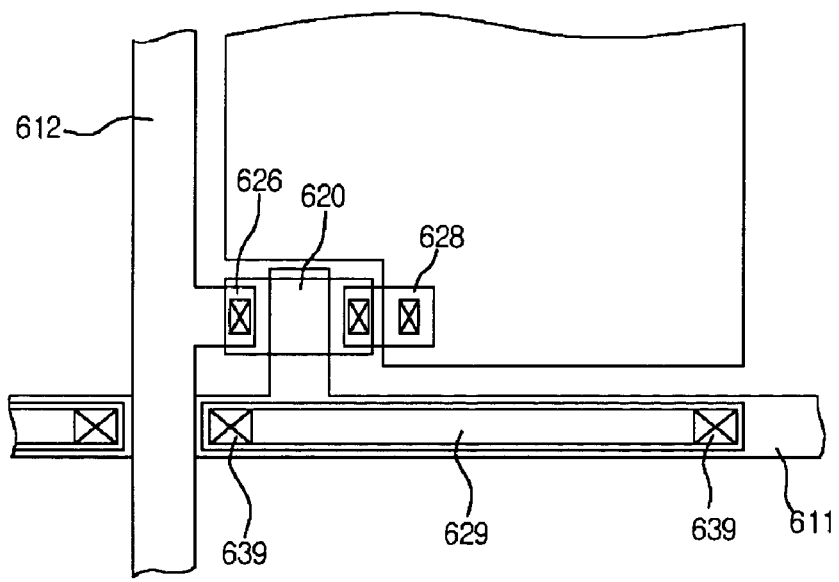

Furthermore, as shown in FIG. 11D, the contact holes 639 for connection of the gate redundancy line 629 may be formed in not all gate redundancy line 629 forming regions, but only in partial regions.

The above various types of contact holes may be applied to all of the top-gate type liquid crystal displays and the bottom-gate type liquid crystal displays. Here, numerals 612 and 626 and 628 respectively designate the data line, the source electrode and the drain electrode.

As described above, in the present invention, when the source and drain electrode or the pixel electrode, the gate redundancy line is formed so as to further form a second metallic film on the gate metal. Accordingly, the present invention may lower the resistance of the gate electrode and the gate line and prevent the gate electrode and the gate line from being disconnected, thereby improving the response speed and the image quality of the liquid crystal display.

Further, the present invention has an advantage of, when the source and drain electrode or the pixel electrode are simultaneously formed, the gate redundancy line is formed thereby increasing a manufacturing efficiency by reducing the number of individual masking processes needed.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. An array substrate for a liquid crystal display, the array substrate comprising:
   a substrate;
   a plurality of gate lines and a plurality of thin film transistors each having a gate electrode, a source electrode, a drain electrode and an active layer formed over the substrate;
   an interlayer insulating layer formed on the thin film transistors;
   a first gate redundancy line internal to the display formed on the interlayer insulating layer, and connected electrically with just one of the gate electrodes, one of the gate lines, and both gate electrode and gate line through a first gate contact hole and formed of the same material as one of the source and drain electrodes;
   a passivation layer provided on the first gate redundancy line and the interlayer insulating layer;
   a pixel electrode electrically connected with the drain electrode through the drain contact hole formed in the passivation; and
   a second gate redundancy line internal to the display formed on the passivation layer, and connected electrically with the first gate redundancy line through a second gate contact hole.

2. The array substrate according to claim 1, wherein the thin film transistor is a top-gate thin film transistor.

3. The array substrate according to claim 2, wherein the first gate contact hole is formed passing through the interlayer insulating layer.

4. The array substrate according to claim 1, wherein the thin film transistor is a bottom-gate thin film transistor.

5. The array substrate according to claim 4, wherein the first gate contact hole is formed passing through the gate insulating layer and the interlayer insulating layer.

6. The array substrate according to claim 1, wherein the second redundancy line is formed of the same material as the pixel electrode.

7. The array substrate according to claim 1, wherein the first gate redundancy line electrically connects with a gate line though a second gate contact hole.

8. An array substrate for a liquid crystal display, the array substrate comprising:
   a substrate;
   a plurality of gate lines and a plurality of thin film transistors each having a gate electrode, a source electrode, a drain electrode and an active layer formed on the substrate;
   an interlayer insulating layer formed on the thin film transistors;
   a passivation layer formed on the interlayer insulating layer;
   a pixel electrode electrically connected with the drain electrode through a drain contact hole formed in the passivation layer; and
   a gate redundancy line internal to the display formed on the passivation layer, and connected electrically with just one of the gate electrodes, the gate lines, and both gate electrode and gate line through a gate contact hole and formed of the same material as the pixel electrode,
   wherein the gate contact hole is formed passing through the interlayer insulating layer and passivation layer.

9. The array substrate according to claim 8, wherein the thin film transistor is a top-gate thin film transistor.

10. The array substrate according to claim 8, wherein the thin film transistor is a bottom-gate thin film transistor.

11. The array substrate according to claim 10, wherein the gate contact hole is formed passing through the gate insulating layer, the interlayer insulating layer, and the passivation layer.

12. The array substrate according to claim 8, wherein the gate redundancy line electrically connects with a gate line though a second gate contact hole.

13. A method of fabricating an array substrate for a liquid crystal display, the method comprising:
   forming a plurality of gate lines and gate electrodes on a substrate;
   forming an interlayer insulating layer on the gate lines and the gate electrodes;
   forming a plurality of thin film transistors with the gate electrodes, source electrodes, drain electrodes, and active layers;
   forming a first gate redundancy line internal to the display on the interlayer insulating layer electrically connected with just one of the gate electrodes, the gate lines, and both the gate electrode and gate line through a first gate contact hole;
   forming a passivation layer on the first gate redundancy line and the interlayer insulating layer;
   forming a drain contact hole in the passivation layer, and forming a pixel electrode connected electrically with the drain electrode through the drain contact hole; and
   forming a second gate redundancy line internal to the display on the passivation layer connected electrically with the first gate redundancy line through a second gate contact hole.

14. The fabrication method according to claim 13, wherein the first gate redundancy line is formed with the same process and of the same material as one of the source electrode and drain electrode.

15. The fabrication method according to claim 13, wherein the thin film transistor having the gate electrode and the source electrode, and the drain electrode is formed in a top-gate manner.

16. The fabrication method according to claim 15, wherein the first gate contact hole is formed passing through the interlayer insulating layer.

17. The fabrication method according to claim 13, wherein thin film transistor having the gate electrode and the source electrode, and the drain electrode is formed in a bottom-gate manner.

18. The fabrication method according to claim 17, including forming a gate insulating layer between the gate electrode and the active layer, wherein the first gate contact hole is formed passing through the gate insulating layer and the interlayer insulating layer.

19. The fabrication method according to claim 13, wherein the second gate redundancy line is formed in the same process and of the same material as the pixel electrode.

20. The fabrication method according to claim 13, wherein the second gate contact hole is formed passing through the passivation layer on the first gate redundancy line.

21. The fabrication method according to claim 13, further comprising forming a second gate contact hole wherein the first gate redundancy line electrically connects with the gate line though the second gate contact hole.

22. A method of fabricating an array substrate for a liquid crystal display, the method comprising:

forming a plurality of gate lines and gate electrodes on a substrate;

forming an interlayer insulating layer on the gate line and the gate electrode;

forming a plurality of thin film transistors with gate electrodes, source electrodes, drain electrodes, and active layers;

forming a passivation layer on the interlayer insulating layer and the thin film transistors; and forming a gate contact hole in the passivation layer, and forming a gate redundancy line internal to the display connected electrically with just one of the gate electrodes, the gate lines, and both gate electrode and gate line through the gate contact hole, wherein the gate redundancy line is formed with the same process and the same material as the pixel electrode.

23. The fabrication method according to claim 22, wherein the thin film transistor is formed in a top-gate manner.

24. The fabrication method according to claim 23, wherein the gate contact hole is formed passing through the interlayer insulating layer and passivation layer.

25. The fabrication method according to claim 22, wherein the thin film transistor is formed in a bottom-gate manner.

26. The fabrication method according to claim 25, including forming a gate insulating layer between the gate electrode and the active layer, wherein the gate contact hole is formed passing through the gate insulating layer, the interlayer insulating layer, gate insulating layer and the passivation layer.

27. The fabrication method according to claim 22, further comprising forming a second gate contact hole in the passivation layer and interlayer insulating layer wherein the gate redundancy line electrically connects with the gate line tough a second gate contact hole.

* * * * *